United States Patent [19]

Ganeshan

[11] Patent Number: 5,580,426

[45] Date of Patent: Dec. 3, 1996

[54] WATER AND ORGANIC CONSTITUENT SEPARATOR AND STRIPPER SYSTEM AND METHOD

[75] Inventor: Ram Ganeshan, Sugar Land, Tex.

[73] Assignee: Gas Research Institute, Chicago, Ill.

[21] Appl. No.: 351,769

[22] Filed: Dec. 8, 1994

[51] Int. Cl.$^6$ ............................................ B01D 3/42
[52] U.S. Cl. ...................... 203/2; 203/18; 203/DIG. 14; 202/197
[58] Field of Search .................................... 203/2, 18, 49, 203/DIG. 14, 91, 4; 202/197; 95/21, 24, 191, 192, 193, 194, 231; 96/157

[56] References Cited

U.S. PATENT DOCUMENTS

| | | | |
|---|---|---|---|
| 3,616,598 | 11/1971 | Foral, Jr. ................................ | 203/18 |
| 3,648,434 | 3/1972 | Gravis, III et al. ..................... | 55/32 |
| 3,840,437 | 10/1974 | Awan et al. ............................. | 203/2 |
| 3,841,382 | 10/1974 | Gravis, III et al. ..................... | 159/16 R |
| 4,280,867 | 7/1981 | Hodgson ................................ | 159/47.1 |
| 4,314,891 | 2/1982 | Knobel .................................. | 203/18 |
| 4,322,265 | 3/1982 | Wood .................................... | 159/47 R |
| 4,332,643 | 6/1982 | Reid ..................................... | 203/18 |
| 4,370,236 | 1/1983 | Ferguson ............................... | 210/634 |
| 4,375,387 | 3/1983 | de Fillipi et al. ....................... | 202/169 |
| 4,689,053 | 8/1987 | Heath .................................... | 203/18 |
| 4,775,395 | 10/1988 | Rojey et al. ............................ | 55/27 |
| 4,913,771 | 4/1990 | McIntyre ............................... | 203/2 |
| 5,084,074 | 1/1992 | Beer et al. ............................. | 55/20 |
| 5,084,187 | 1/1992 | Wilensky .............................. | 210/768 |
| 5,141,536 | 8/1992 | Schievelbein et al. ................. | 55/208 |
| 5,167,773 | 12/1992 | Eagan et al. .......................... | 203/DIG. 14 |
| 5,167,838 | 12/1992 | Wilensky .............................. | 210/768 |
| 5,176,798 | 1/1993 | Rodden ................................. | 202/159 |
| 5,209,762 | 5/1993 | Lowell .................................. | 55/31 |
| 5,234,552 | 8/1993 | McGrew et al. ....................... | 203/18 |

*Primary Examiner*—Jill Warden
*Assistant Examiner*—Robert Carpenter
*Attorney, Agent, or Firm*—Dick and Harris

[57] ABSTRACT

A regenerating system, for the removal of water and potentially harmful organic constituents from a dehydration fluid used to dehydrate natural gas. The system includes a device to assure positive flow of the water and organic constituent vapor out of the regenerator, to, in turn, control back pressure associated with the regenerator during the distillation process.

12 Claims, 3 Drawing Sheets

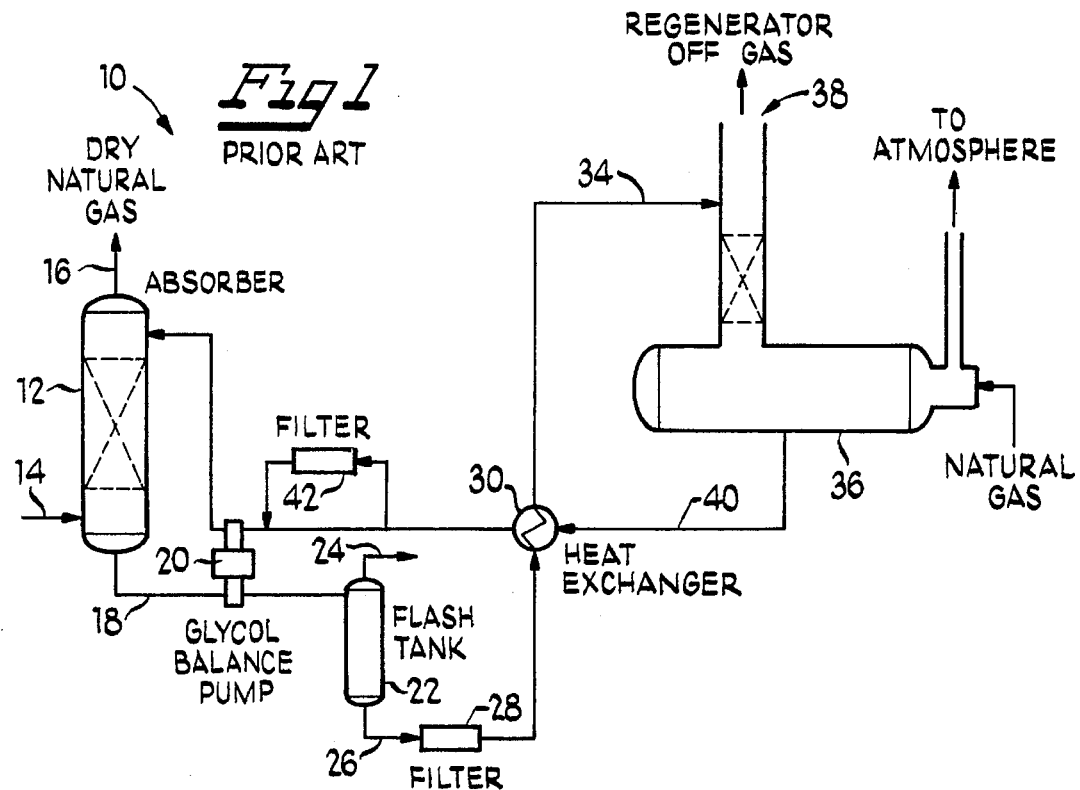
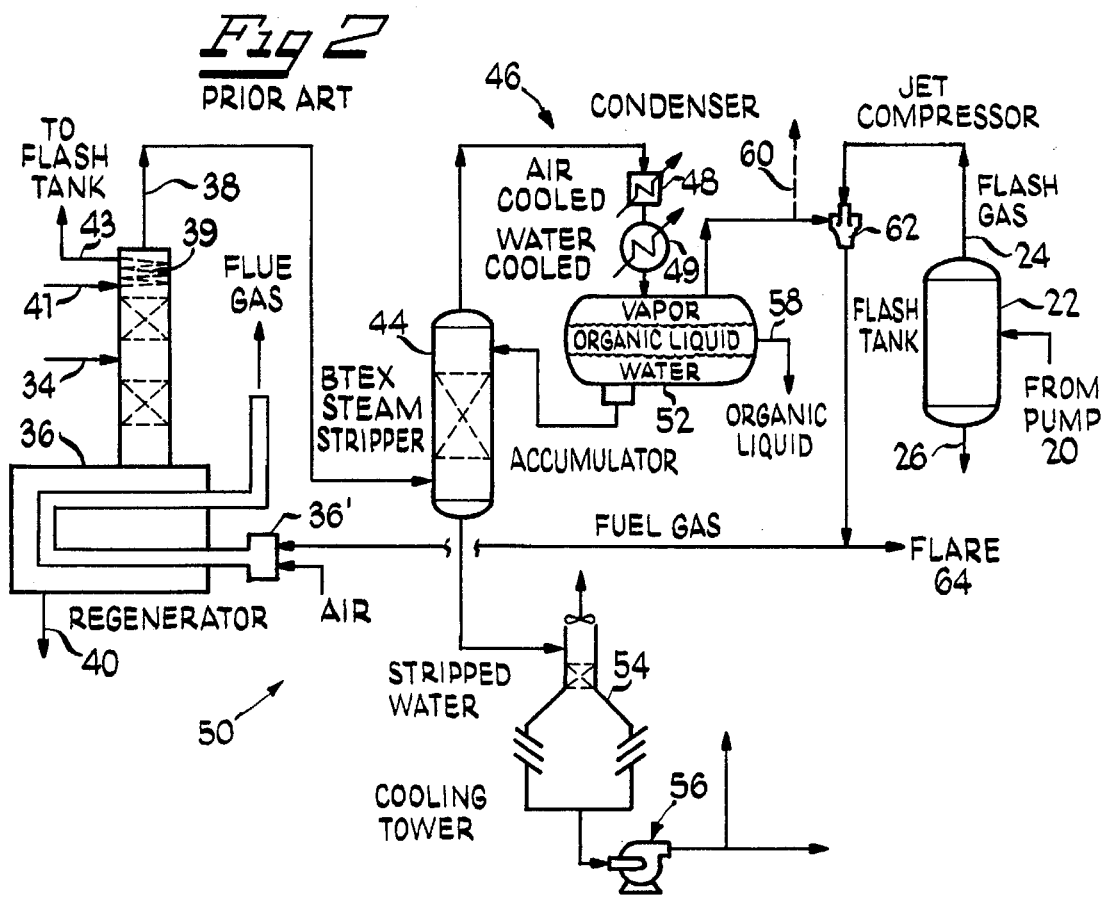

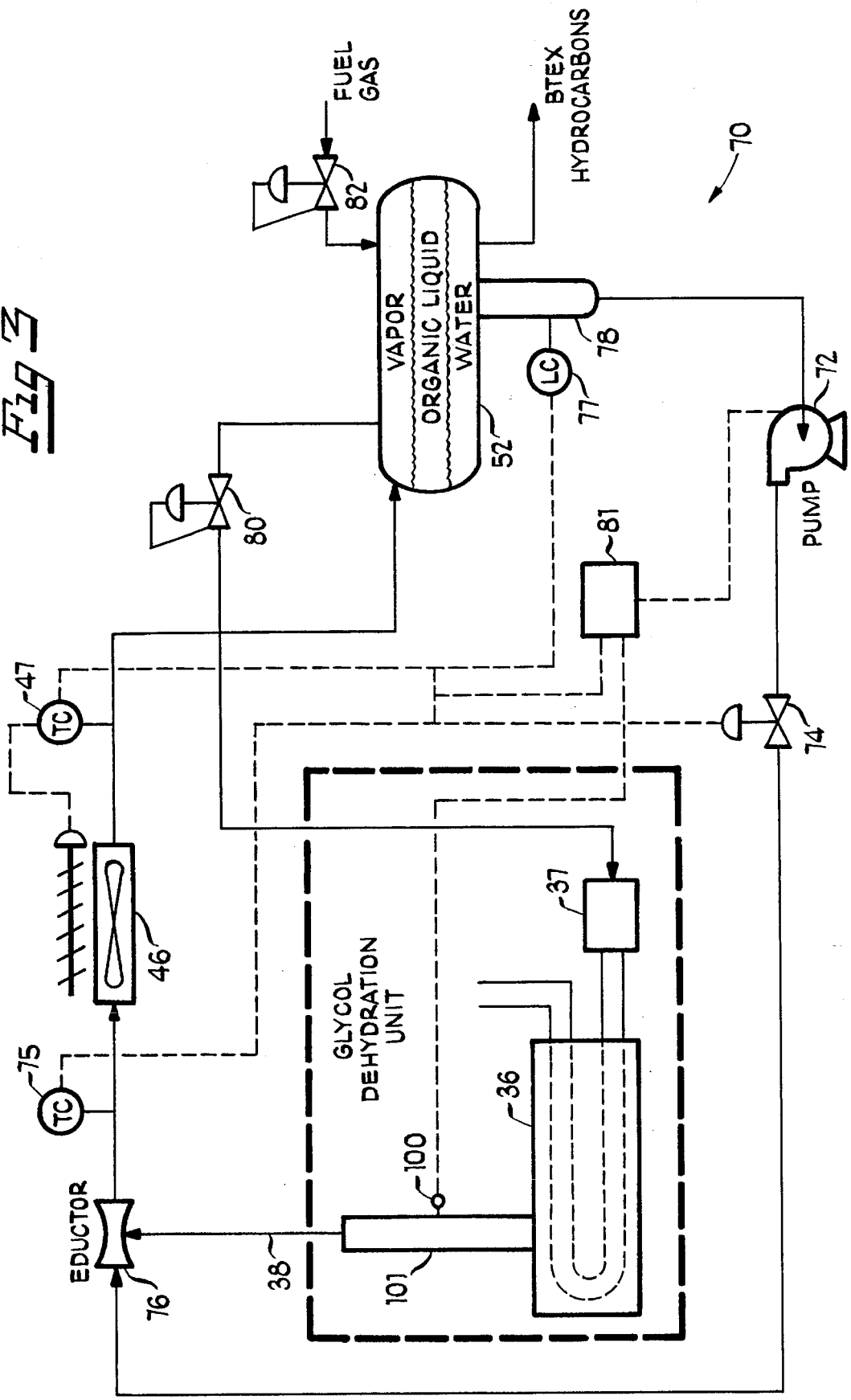

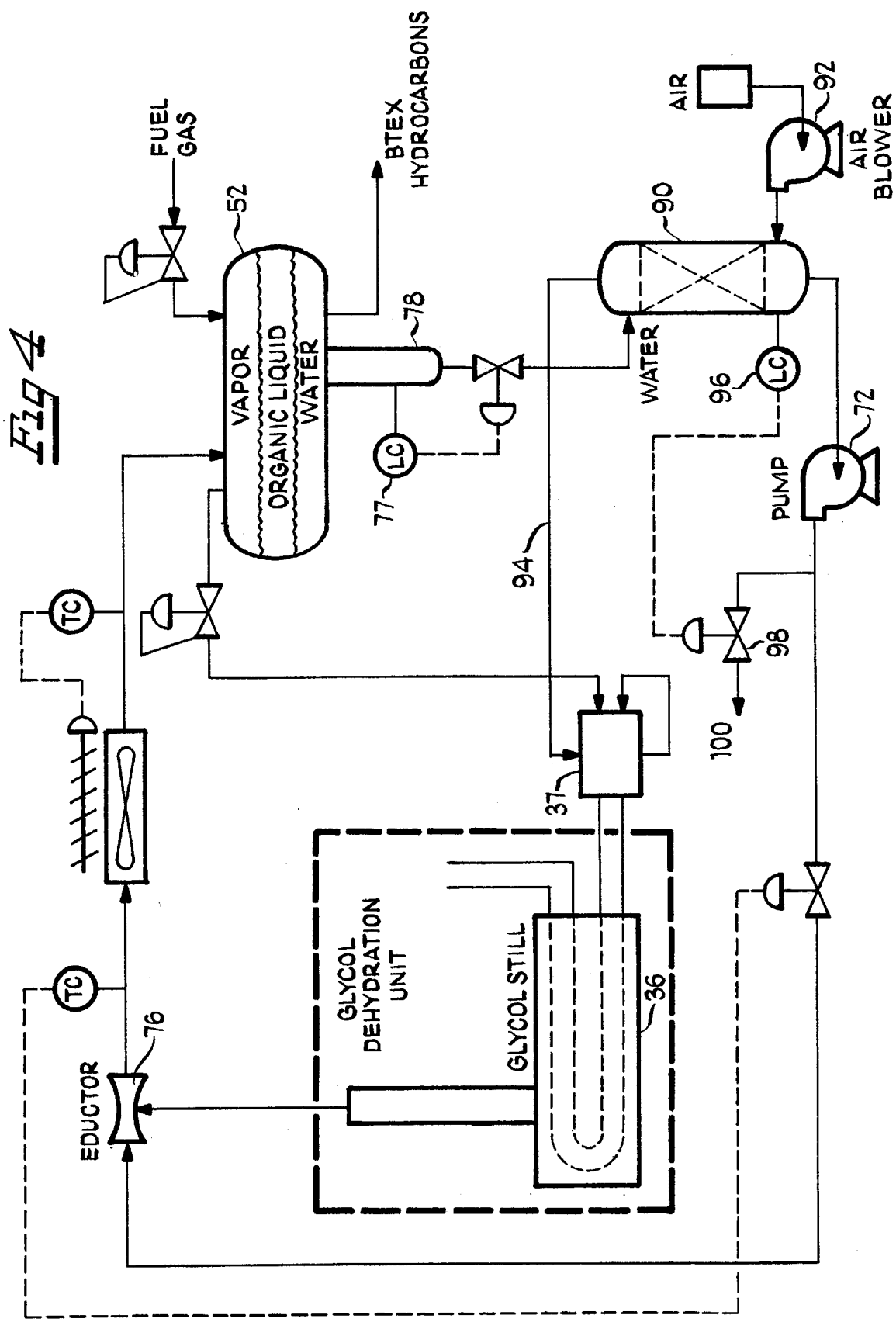

5,580,426

1

WATER AND ORGANIC CONSTITUENT SEPARATOR AND STRIPPER SYSTEM AND METHOD

BACKGROUND OF THE INVENTION

1. Field of the Invention

The present invention relates to an apparatus for separating moisture, and more particularly water from a glycol regenerator/still which has been removed from, for example, natural gas during the dehydration of same.

2. The Prior Art

Natural gas, when it is drawn from underground sources, often is "contaminated" with water vapor. The presence of such water vapor is undesirable, since it can cause corrosion as well as facilitate hydrate formation in natural gas pipelines.

To remove such water vapor, dehydrators, such as glycol dehydrators have been used to remove the water vapor from the gas. Other forms of dehydrators, which do not absorb the water, or which utilize solutions other than glycol, have also been known in the art.

With respect to the use of glycol, and for example, triethylene glycol, such a solution acts as an absorbent with respect to water vapor. The moist glycol is then later distilled in what is known as a glycol regenerator. After the water is separated from the glycol solution, this "clean" glycol is then reused for further dehydration of natural gas.

Inasmuch as natural gas typically contains various volatile organic compounds (VOCs) such as benzene, toluene, ethylbenzene, and xylenes (collectively known as BTEX), as well as water, and inasmuch as such organics also become absorbed into the glycol during dehydration, these potentially harmful constituents likewise become separated from the glycol during the distillation process. However, because of the toxicity of the BTEX components and, in turn, the potential danger they may cause if released into the ambient environment, methods have been devised for removing such BTEX from the water during distillation from the glycol solution toward operable safe use of same.

One such system for removing BTEX from recovered water is shown in Lowell, U.S. Pat. No. 5,209,762, the disclosure of which is incorporated herein by reference. In the Lowell '762 system, the water vapor is passed through a condenser having one or more stages which may be air and/or water cooled. The condensate is then collected in a three phase separator, in which the condensate forms in three distinct layers: on bottom, purified liquid water; in the middle, liquid BTEX; on top, gaseous BTEX. The liquid water may then be passed to a series of one or more strippers, and other subsequent polishing stages, to further reduce the amount of BTEX and other undesirable organic constituent compounds. The liquid BTEX is drained off and recovered—inasmuch as BTEX, in liquid form, has viable commercial uses, such as for fuel. The gaseous BTEX is either emitted into the ambient environment, burned off as waste gas flare, or, alternatively, it is added to the fuel gas used to provide the heat for the glycol regenerator. Accordingly, when the gaseous BTEX compounds are combusted, they are broken down into environmentally more acceptable combustion byproducts.

The Lowell '762 glycol dehydration and BTEX separation systems are disclosed and contemplated as being a combined installation. One problem which may arise during the operation of such a system is that the back pressure of the glycol regenerator column may fluctuate and become too great, impeding flow of the glycol through the regenerator, and of the water/BTEX vapor through the regenerator column. In addition, to having possible slowed flow-through the water/BTEX vapor, a secondary effect of such variable, uncontrolled back pressure, is the buildup in the regenerator of various deposits which can further accelerate the impediment of flow-through, and build up of further deposits, as well as contributing to the overall degradation of the regenerator structure.

Indeed, such back pressure may affect the boiling point of the glycol/$H_2O$ system at a given composition (wherein higher pressure increases the boiling point). Accordingly, this change in the boiling point will 1) increase glycol decomposition, 2) cause corrosion of the firebox tubes, and 3) require more fuel, inasmuch as a higher temperature will be required to distill the glycol.

Accordingly, it would be desirable to provide a glycol dehydration system which would include a BTEX separation system which would have an improved flow-through of water/BTEX vapor from the regenerator to the condenser/accumulator stage.

SUMMARY OF THE INVENTION

The present invention is a system for separating water and volatile organic constituent materials recovered during the dehydration of a gas, such as a natural gas, wherein the system includes a dehydrating solution, such as glycol which absorbs water from the natural gas. The system comprises means for distilling water and organic constituent vapor from the glycol solution; means for condensing the water and organic constituent vapor, operably connected to the means for distilling water and organic constituent vapor; means for separating the condensed water and organic constituent vapor into separate constituents of liquid water, liquid organic constituent, and residual gaseous organic constituent; means for positively drawing the water and organic constituent vapor from the distilling means and propelling the water and organic constituent vapor to the condensing means, and in turn, to the separating means, the means for positively drawing the water and organic constituent vapor from the distilling means being operably associated with the separating means and the distilling means.

The invention further comprises conduit means for connecting the distilling means with the condensing means, for the transportation of the water and organic constituent vapor to the condensing means.

In a preferred embodiment of the invention, the means for positively drawing the water and organic constituent vapor from the distilling means further comprises a source of fluid; means for propelling the fluid along a fluid conduit; eductor means operably disposed in the conduit means connecting the distilling means and the condensing means, the fluid conduit connecting the means for propelling the fluid with the eductor means, such that flow of the propelled fluid merges with the flow of the water and organic constituent vapor, and the water and organic constituent vapor become entrained in the propelled fluid, and the water and organic constituent vapor become positively drawn from the distilling means.

The source of fluid preferably is the liquid water in the separating means.

In a preferred embodiment of the invention, the organic constituent comprises hydrocarbon materials, which may include components from at least one of the following: benzene, toluene, ethylbenzene, and xylenes.

The system may further comprise means for controlling the means for positively drawing the water and organic constituent vapor from the distilling means, for regulating the rate of flow of the water and organic constituent vapor. The control means comprises temperature sensing means, operably disposed in the flow path of the water and organic constituent vapor, downstream of the eductor means; valve means operably disposed in the fluid conduit, upstream of the eductor means; processor means, operably connected to the temperature sensing means and the valve means, so as to actuate the valve means to reduce flow when the temperature sensed is less than a predetermined temperature, and to increase flow when the temperature sensed is greater than a predetermined temperature.

The system may also further comprise means for regulating the level of liquid water in the fluid conduit. In particular, the means for regulating the level of liquid water comprises an accumulator operably associated with the separating means; means for sensing the level of water in the accumulator; valve means operably associated with the accumulator; control processor means operably associated with the sensing means and the valve means, operably configured so as to release water from the accumulator when the level therein exceeds a predetermined value.

The invention also comprises a method for separating volatile organic constituent materials from water recovered during the dehydration of natural gas or a similar fuel gas, of the kind employing a dehydrating solution, such as glycol, to absorb water from the natural gas. In a preferred embodiment, the method comprises the steps of:

a) distilling the water and organic constituent laden glycol in distilling means after the glycol has been employed to absorb the water from the natural gas, so as to separate water and organic constituent vapor from the liquid glycol;

b) exerting a propulsive force on the water and organic constituent vapor so as to cause the water and organic constituent vapor to be propelled through and away from the distilling means;

c) conducting the water and organic constituent vapor to a condensing means;

d) conducting the at least partially condensed water and organic constituent vapor from the condensing means to a separating means;

e) separating the at least partially condensed water and organic constituent vapor into at least three constituents including liquid water, liquid organic constituent and gaseous organic constituent.

The method of the present invention may also further comprise the step of retrieving the liquid water and liquid organic constituent for later utilization.

In another preferred embodiment of the invention, the step of exerting a propulsive force on the water and organic constituent vapor further comprises the steps of conducting a pressurized stream of fluid, from source of fluid, into intersecting relationship with the water and organic constituent vapor, such that the water and organic constituent vapor become entrained in the pressurized stream, and exposing the water and organic constituent vapor to a partial vacuum so as to draw the water and organic constituent vapor from the distilling means.

The method may also comprise the steps of sensing the temperature of the flow of water and organic constituent vapor, downstream of the intersection of the pressurized stream of fluid with the water and organic constituent vapor flow; and controlling the flow of pressurized fluid, so as to increase the flow, if the sensed temperature is higher than a predetermined temperature, and so as to decrease the flow, if the sensed temperature is lower than a predetermined temperature.

Alternatively, the method may further comprise the steps of monitoring the level of fluid in the source of fluid; and controlling release of fluid into the flow of pressurized fluid so as to introduce less fluid when the level of fluid is lower than a predetermined level, and release to a drain fluid, when the level of fluid is higher than a predetermined level.

The present invention also comprises a system for separating water recovered during the dehydration of a gas, such as a natural gas, wherein the system includes a dehydrating solution used to initially absorb water from the gas. In particular, the system comprises means for distilling water from the solution after dehydration of the gas; and means for positively drawing water from the distilling means, operably associated with the distilling means; means for condensing the water from the distilling means, operably associated with the water drawing means; means for initially separating the condensed water, from the condensing means, from any organic constituents which may also have been drawn from the distilling means, operably associated with the condensing means; and means for further stripping any remaining organic constituents from the separated condensed water.

The means for positively drawing water from the distilling means preferably comprises a source of fluid; a fluid conduit connecting the separating means and the distilling water; means for propelling the fluid along the fluid conduit; and eductor means operably disposed in the conduit means for merging at least a portion of the fluid from the source of fluid and the separated water into a single stream.

In an embodiment in which the source of fluid for the water drawing means is the condensed water from the means for initially separating the condensed water, the means for further stripping organic constituents comprises a column stripper operably disposed in the fluid conduit between the means for initially separating the condensed water, and the means for propelling the fluid along the fluid conduit, in which the organic constituents are driven from the condensed water by a stream of forced air.

Preferably, the means for distilling water includes a burner, and the stream of forced air, carrying organic constituents, is directed to the burner to supply combustion air and at least a portion of the combustion fuel gas.

An alternative embodiment of the invention also comprises a method of separating water, recovered during the dehydration of a gas, such as natural gas, from a dehydrating solution, the method comprising the steps of:

a) distilling the water from the dehydrating solution with distilling means;

b) positively drawing the distilled water through and away from the distilling means;

c) condensing the water from the distilling means;

d) performing an initial separation from the condensed water, of any organic constituents which may have also been drawn from the dehydrating solution; and e) stripping further organic constituents from the separated condensed water.

The step of positively drawing the distilled water preferably comprises the steps of:

a) introducing a pressurized stream of fluid, from a fluid source, along a fluid conduit, into intersecting relationship with the distilled water;

b) exposing the distilled water to a partial vacuum associated with the pressurized streams so as to positively draw the water from the distilling means into the pressurized stream.

In an embodiment wherein the source of fluid for the water drawing means is the condensed water from the means for initially separating the condensed water, the step of further stripping organic constituents comprises passing the condensed initially separated water through a column stripper operably disposed in the fluid conduit between the location where the fluid becomes pressurized, and driving off organic constituents with a stream of forced air driven through the column stripper.

In an embodiment in which the step of distilling the water includes the step of providing heat with a burner, the method further comprises the step of utilizing the stream of forced air and organic constituents from the column stripper to supply combustion air and at least a portion of the combustion fuel for the burner.

BRIEF DESCRIPTION OF THE DRAWINGS

FIG. 1 is a schematic illustration of a prior art glycol dehydration apparatus;

FIG. 2 is a schematic illustration of a prior art BTEX separation apparatus used with the prior art glycol dehydration apparatus of FIG. 1, and illustrating the glycol regenerator of the dehydration apparatus of FIG. 1;

FIG. 3 is a schematic illustration of a portion of an improved glycol dehydration and BTEX separation apparatus according to the present invention and FIG. 4 is a schematic illustration of an alternative embodiment of the invention.

BEST MODE FOR PRACTICING THE INVENTION

While this invention is susceptible of embodiment in many different forms, there is shown in the drawings and will be described herein in detail two specific embodiments, with the understanding that the present disclosure is to be considered as an exemplification of the principles of the invention and is not intended to limit the invention to the embodiments illustrated.

A prior art glycol dehydration system 10 is shown in FIG. 1. Moisture laden natural gas is inletted into absorber 12 at inlet 14. The gas contacts the regenerated glycol in absorber 12 in a known manner, and leaves absorber 12 as dry natural gas at outlet 16. Water and BTEX laden glycol leaves absorber 12 at outlet 18, passing through balance pump 20, to flash tank 22. Balance pump 20 is provided to regulate the flow of regenerated glycol going into absorber 12, as well as the flow of used glycol exiting absorber 12. In flash tank 22, the used glycol is expanded, with light gases, such as methane and propane, being vented at 24. The light gases may be simply burned off, or piped for use in the glycol regenerator 36. The remaining liquid glycol and water will exit flash tank 22 at 26, pass through a filter 28, and proceed to heat exchanger 30, where the liquid glycol and water will pick up heat from the regenerated glycol exiting regenerator 36.

The warmed liquid glycol and water are then conducted at 34 to regenerator 36, which may be fired by natural gas, which may be mixed with the light gases from the flash tank 22, as well as gaseous BTEX from the separator, where they are heated such that the water and BTEX are desorbed, at 38.

The regenerated glycol exits regenerator 36 at 40, and is conducted through heat exchanger 30. After giving off heat to the glycol and water mixture from absorber 12, the regenerated glycol may be circulated through a filter 42, pumped up to appropriate pressure at balance pump 20, and circulated through absorber 12, to complete the glycol circuit.

In prior art BTEX separation system 50 (FIG. 2), regenerator 36 gives off water/BTEX vapor at 38. Regenerator column 37 may include heat exchanger 39 (not shown in FIG. 1), having an entrance 41 and exit 43, for preheating the liquid glycol/water mixture after exiting absorber 12, and before expansion in flash tank 22.

The water/BTEX vapor is then, typically, passed through a steam stripper 44, as is known in the prior art, and then through a condenser 46, which, as in the illustrated embodiment, may comprise an air cooled stage 48 and a water cooled stage 49. The condensates are conducted to a three phase separator 52, in which the condensates divide into a lowermost layer of water, a center layer of liquid BTEX, and an upper layer of gaseous BTEX. The liquid water may be circulated through stripper 44, for further polishing, cooled at cooler 54, and pumped off for other use, at 56. The liquid BTEX and other organic materials are separated from the liquid water at 58, for collection and possible use, for example, as a liquid fuel material. The gaseous BTEX may then simply be vented, at 60, or drawn, such as by a jet pump 62 driven by the flash gas from flash tank 24, to be burned/combusted at burner 36' for regenerator 36 or in a flare 64.

In the prior art system of FIGS. 1 and 2, several possible drawbacks have been encountered. Since there is no positive means for causing flow of the water/BTEX vapor from condenser 36 through the various possible components to condenser 46 and in turn to a three phase separator 52, other than possibly gravity and the expansion of the heating vapor in the regenerator, undesirable back pressure can develop in the system. This back pressure can have the result of causing build up of residues in the regenerator, and the build up of pressure can affect the boil off of the water/BTEX from the glycol, as well as the proper separation of the water, liquid BTEX and gaseous BTEX, in the separator.

In order to properly control the pressure in the regenerator/separator circuit, improved BTEX separation system 70 is provided, and illustrated in FIG. 3. Regenerator 36 is, as in the prior art configuration, fired by burner 37. A portion of the liquid water drawn off of separator 52 is directed to pump 72, which raises the pressure of the water to, for example, 50 psig. The flow rate and pressure of the water is further controlled by remotely controlled valve 74, which is controlled by thermocouple 75 and control means 81, which may include an appropriately programmed microprocessor, so as to maintain the pumped water pressure in a desired preselected range. Release of the water from separator 52, to pump 72, may also be controlled by the microprocessor, based upon the readings of other sensors in the system, such as temperature sensor 47.

It is also contemplated that system 70 include pressure sensor transmitter 100 operably associated with control means 81 and pump 72 for purposes of precluding the distilling column 101 of regenerator 36 from inadvertently collapsing. Accordingly, sensor 100 will continuously transmit the pressure within column 101 to control means 81. Should control means determine, for example, that the pressure within the column is too low (as a result of the draw caused by eductor 76), then the control means will alter pump 72 to, in turn, reduce the flow rate of the fluid being propelled therefrom, thusly increasing the pressure to within a desirable range.

The water is then sent through eductor 76, which may be installed adjacent vapor exit 38 of regenerator 36. The eductor 76 draws the water/BTEX vapor and entrains it in the pumped water flow. Eductor 76 has a venturi-type configuration, which causes a pressure drop to, for example, 5 psig, and exerts a partial vacuum to the flow of water/BTEX vapor 38 coming from regenerator 36. The pumped water, being at a substantially lower temperature than the water/BTEX vapor exiting regenerator 36, causes the condensation of at least some of the water/BTEX vapor. The pumped water, with the water/BTEX mix is then passed through heat exchanger/condenser 46 to cause further condensation of BTEX vapor.

The pumped water, liquid BTEX, and entrained water/BTEX vapor are conducted to three phase separator 52, where the water, BTEX liquid and BTEX vapor separate substantially in the manner described with respect to the prior art system. BTEX vapor is then directed from an the separator, through valve 80, to burner 37 where it is combusted (and broken down into non-harmful constituents) and accordingly used to heat regenerator 36.

In order to propel the BTEX vapor toward burner 37, the fuel gas is first inletted through valve 82, into the upper layer in separator 52, so that the fuel gas "sweeps" the BTEX gas out of separator 52. This enables a more continuous flow through the system, and facilitates the BTEX toward and into the burner for combustion.

When excess water has been collected in separator 52, a portion of the water, not needed to maintain proper volumetric flow rate through eductor 76, is released through a drain (not shown). A level control 77 may be connected to accumulator 78 to assure that a sufficient amount of water is maintained in the system to maintain the desired pressure, with adequate reserve, to replenish the system, when, for example, the flow rate is increased in response to commands by the control 81.

The system 70 is operably configured so as to maintain slightly higher pressure in separator 52, than in regenerator 36, so that the fuel and BTEX gases will further tend to flow from separator 52 to regenerator burner 37.

FIG. 4 illustrates an alternative embodiment of the invention. Instead of piping the separated water directly from the separator 52 to pump 72, a stripper column 90, the construction and operation of which is well known, may be placed in the flow path between separator 52 and pump 72.

Ambient air is supplied by pressure, by blower 92, for providing the additional stripping action. The air displaces BTEX or other organic constituents from the water and carries such constituents off to burner 37, by line 94, to be used as fuel for regenerator 36. The mixture of air and organic constituents may be preheated and/or treated with a catalyst, in a known manner, in order to facilitate the break down of the BTEX or other organic constituents during combustion. Unlike the previous embodiment, in which the burner 37 received combustion oxygen via a natural draft arrangement, burner 37 of the present embodiment has forced air draft, substantially supplied by the forced air being driven through the stripper column 90.

Level control 96 is provided to assist in the control of the level of water in column 90. If the water level rises above a predetermined level, valve 98 is opened, to permit water to be released to drain at 100. The air pressure in stripper column 90 is at only a very slight pressure relative to ambient, for example, 0.25 psig.

The remaining elements of the system according to FIG. 4 function as described with respect to the prior embodiment.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

I claim:

1. A system for separating water recovered during the dehydration of a gas wherein the system includes a dehydrating solution used to initially absorb water from the gas, the system comprising:

means for distilling predominantly vaporous fluid which includes water vapor, from a dehydrating solution after the dehydrating solution has been utilized for dehydration of a gas, so that a stream of predominantly vaporous fluids exits the distilling means;

means for imparting a propulsive force to the stream of predominantly vaporous fluid which includes water vapor, distilled from the dehydrating solution, so as to draw the fluid which includes water vapor, from the distilling means, disposed at a position downstream of the distilling means, the means for imparting a propulsive force including means for merging a stream of pressurized fluid with the stream of predominantly vaporous fluid exiting the distilling means;

means for condensing the water vapor from the distilling means, operably associated with the means for imparting a propulsive force disposed at a position downstream of the means for imparting a propulsive force;

means for initially separating the condensed water, from the condensing means, from any organic constituents which may also have been drawn from the distilling means, disposed at a position downstream of the condensing means, said means for initially separating including an aqueous phase outlet in fluid communication with a means for pressurizing said aqueous phase, said means for pressurizing forming said stream of pressurized fluid from said aqueous phase;

means for further stripping any remaining organic constituents from the separated condensed water, positioned downstream of the means for initially separating the condensed water.

2. The system according to claim 1, wherein the means for imparting a propulsive force comprises:

a first fluid conduit, connecting a downstream side of the distilling means and the separating means;

a second fluid conduit, connecting the aqueous phase outlet to the first fluid conduit;

means, connected to the second fluid conduit, for propelling the fluid from the aqueous phase outlet along the second fluid conduit, toward a position in the conduit between the distilling means and the separating means; and eductor means operably disposed at said position in the conduit between the distilling means and the separating means for merging at least a portion of the fluid from the aqueous phase outlet and the separated water into a single stream.

3. The system according to claim 2 wherein the means for further stripping organic constituents comprises a column stripper operably disposed in the fluid conduit between the means for initially separating the condensed water, and the means for propelling the fluid along the fluid conduit, in which the organic constituents are driven from the condensed water by a stream of forced air.

4. The system according to claim 3, wherein the means for distilling water includes a burner, and the stream of forced air, carrying organic constituents, is directed to the burner to supply combustion air and at least a portion of the combustion fuel gas.

5. The system according to claim 2 further comprising means to sense pressure at the distilling means.

6. The system according to claim 5 further including means to alter flow of the propelled fluid, the flow altering means being responsive to the pressure sensing means.

7. A method of separating water, recovered during the dehydrating of the gas, from a dehydrating solution, the method comprising the steps of:

a) distilling a predominantly vaporous fluid which includes water vapor from a dehydrating solution after the dehydrating solution has been utilized for dehydration of a gas with distilling means, so as to produce a stream of predominantly vaporous fluid emanating from the distilling means;

b) imparting a propulsive force of the stream of predominantly vaporous fluid which includes water vapor through and away from the distilling means, by merging a stream of pressurized fluid from the stream of predominantly vaporous fluid emanating from the distilling means at a position downstream of the distilling means;

c) condensing the water vapor from the stream of predominantly vaporous fluid from the distilling means;

d) performing an initial separation, with an initial separation device having an aqueous phase outlet, from the condensed water, of any organic constituents which may also have been drawn from the dehydrating solution, the step of merging a stream of pressurized fluid with the stream of predominantly vaporous fluid being accomplished by directing aqueous phase water from the aqueous phase outlet in the initial separation device to a device for pressurizing the aqueous phase to form the stream of pressurized fluid;

e) stripping further organic constituents from the separated condensed water.

8. The method according to claim 7, wherein the step of imparting a propulsive force to the stream of predominantly vaporous fluid comprises the steps of;

a) introducing a pressurized stream of fluid, from the aqueous phase outlet, along a fluid conduit, into intersecting relationship with the distilled water; and b) exposing the distilled water to a partial vacuum associated with the pressurized stream so as to positively draw the water from the distilled water into the pressurized stream.

9. The method according to claim 8, wherein the step of further stripping organic constituents comprises passing the condensed initially separated water through a column stripper operably disposed in the fluid conduit between the location where the condensed water is initially separated, and the location where the fluid becomes pressurized, and driving off organic constituents with a stream of forced air driven through the column stripper.

10. The method according to claim 9 wherein the step of distilling the water includes the step of providing heat with a burner, and further comprises the step of utilizing the stream of forced air and organic constituents from the column stripper to supply combustion air and at least a portion of the combustion fuel for the burner.

11. The method according to claim 8, further comprising the steps of:

sensing the pressure of the distilling means; and altering the flow rate of the pressurized stream of fluid in response to the pressure sensed.

12. The method according to claim 8, further comprising the steps of:

inletting a fuel gas into the separator;

sweeping the organic constituents out of the separator and toward a burner as a result of the inletted fuel gas.

* * * * *

UNITED STATES PATENT AND TRADEMARK OFFICE
CERTIFICATE OF CORRECTION

PATENT NO. : 5,580,426
DATED : December 3, 1996
INVENTOR(S) : Ram Ganeshan

It is certified that error appears in the above-indentified patent and that said Letters Patent is hereby corrected as shown below:

Col. 9, line 26                      After the word force delete "of" and insert instead -- to --.

Signed and Sealed this

Eleventh Day of March, 1997

Attest:

BRUCE LEHMAN

*Attesting Officer*          *Commissioner of Patents and Trademarks*